US009308855B1

(12) United States Patent
Hancock et al.

(10) Patent No.: US 9,308,855 B1
(45) Date of Patent: Apr. 12, 2016

(54) HOOK END GRIPPER OF LOAD SECURING STRAPS

(71) Applicants: Jeffrey D. Hancock, Uintah, UT (US); Christopher N. Schenck, Uintah, UT (US)

(72) Inventors: Jeffrey D. Hancock, Uintah, UT (US); Christopher N. Schenck, Uintah, UT (US)

( * ) Notice: Subject to any disclaimer, the term of this patent is extended or adjusted under 35 U.S.C. 154(b) by 0 days.

(21) Appl. No.: 14/544,710

(22) Filed: Feb. 9, 2015

(51) Int. Cl.
 *B60P 7/08* (2006.01)

(52) U.S. Cl.
 CPC .................... *B60P 7/0807* (2013.01)

(58) Field of Classification Search
 CPC ............ B60D 1/07; B60D 1/52; B60D 1/075; B60D 1/565; B60D 1/02; B60D 1/06; B60D 1/241; B60D 1/28; B62J 11/00; B62J 1/12; B62J 1/18; B62J 2099/0006; B62J 27/00; B62J 99/00; B62J 9/00; B62K 23/06; B62K 21/12; B62B 11/00; B62B 27/005; B62B 5/001
 USPC ............ 280/491.5, 511, 416.1, 506; 410/106, 410/104, 112, 115, 155, 39, 8, 94; 414/532
 See application file for complete search history.

(56) References Cited

U.S. PATENT DOCUMENTS

| 4,484,380 | A | * | 11/1984 | Redi | A44C 5/2038 24/116 A |
| 6,168,360 | B1 | * | 1/2001 | Knox | B60P 7/0815 410/108 |
| 7,513,727 | B2 | * | 4/2009 | Nadherny | B60P 7/0807 410/106 |
| 7,534,213 | B2 | * | 5/2009 | Shelbourne | A61H 1/024 601/34 |
| 7,658,578 | B1 | * | 2/2010 | Weibl | B60J 7/104 296/100.16 |
| 8,079,793 | B2 | * | 12/2011 | Thoma | B60P 7/0807 410/106 |
| 2006/0177282 | A1 | * | 8/2006 | Blosser | B60P 7/0823 410/106 |

* cited by examiner

*Primary Examiner* — Glenn Dayoan
*Assistant Examiner* — Sunsurraye Westbrook

(57) ABSTRACT

A hook end gripper on ends of flexible tie-down straps used to secure loads on a supporting surface. The hook end gripper includes: a mounting base easily attached to a load supporting surface; a ring having an arch on one end to receive a hook on the end of a strap; a tunnel holding an end of a ring opposite the arch such that the ring is positioned to receive the end hook of the strap; a resilient and deformable tongue having an edge shaped to conform to an inside of the arch and spaced from the inside of the arch by a distance less than the thickness of an end of the hook on the end of the strap to be attached to the arch; and a body section of the gripper, secured to opposite sides of the D-ring and to the tongue.

Figure 1:
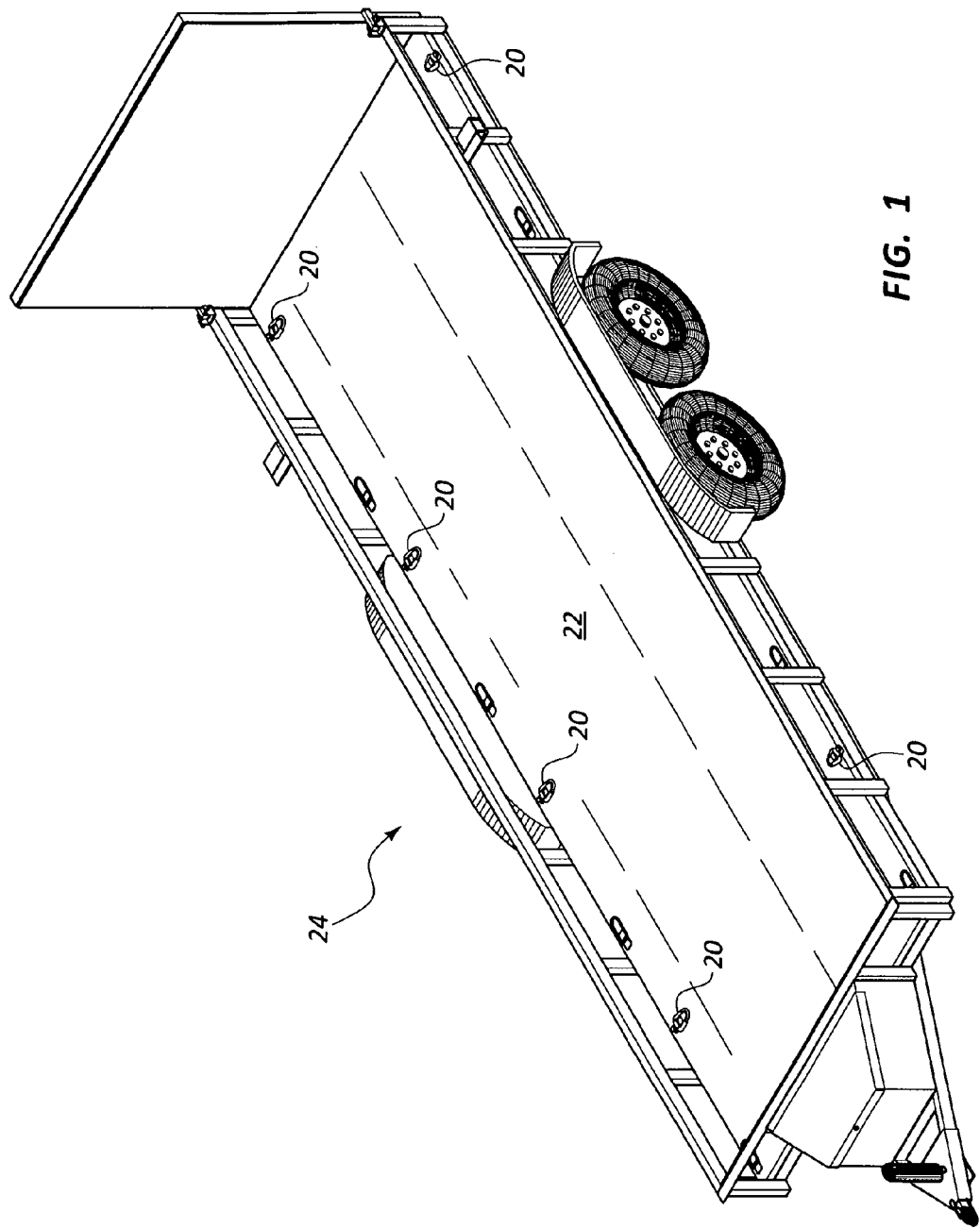

10 Claims, 11 Drawing Sheets

US 9,308,855 B1

HOOK END GRIPPER OF LOAD SECURING STRAPS

CROSS REFERENCE TO RELATED APPLICATION(S)

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to hold-down devices that are attached to a surface on which objects required to be secured are positioned.

More particularly, pivoting loops common to D-rings, O-rings and other structures having arch sections have long been secured by pivot mounts to a load carrying surfaces. Such pivoting loops serve as hold-down devices that include an arch section that will receive hooks on the ends of flexible straps, including fabric belting straps, ropes, cables, chains, and the like, that are passed over and used to secure loads to the load carrying surface.

D-rings, O-rings and other devices (hereinafter, collectively referred to as "D-rings", having an arch section, easily receive hooks provided at the ends of flexible straps. However, it is not uncommon for the first hook at one end of a flexible strap to become disconnected from a D-ring to which it has been connected during placement of the flexile strap over a load; connection of the hook at the opposite end of the flexible strap to another D-ring; and tightening of the strap. Consequently, it frequently becomes necessary for a user to re-attach the first hook (and sometimes the second hook), before the strap can be tightened to hold the load in place.

There are also occasions when one or both end hooks of a tightened flexible strap come loose from the D-ring(s) to which they have been previously attached. If a load shifts, slides, vibrates, or in any way moves while being transported, the hooks may separate from the D-rings, leaving the load improperly secured. In addition, released straps may fall from a transporting vehicle and be lost.

SUMMARY OF THE INVENTION

Objects of the Invention

A principal object of the present invention is to provide a hold-down device, for use with a flexible strap having hooks on the ends thereof, that includes the ease of use of a D-ring anchored to a load carrying surface, while better insuring that a connection between the hold-down device and a strap end hook connected thereto is maintained during securement of a load on the load carrying surface with a tensioned flexible strap, even if the tension originally placed on the strap is reduced.

Features of the Invention

Principal features of the invention include a pivot mounting base; a D-ring having a pivot section to be pivotally secured by the mounting base; leg sections extending from each end of the straight section; a curved hook engaging arch section, curved away from the pivot section and forming a continuation of the leg sections; and a flexible tongue of durable, resilient material such as silicone rubber, or silicone plastic, secured to the D-ring and having a curved edge spaced a distance from the curved hook engaging portion less than the thickness of a hook to be connected to the D-ring and shaped to be parallel to the curved hook engaging arch section.

Additional objects and features of the invention will become apparent to those skilled in the art to which the invention pertains from the following drawings, detailed description, and claims.

BRIEF DESCRIPTION OF THE SEVERAL FIGURES OF THE DRAWINGS

Figure 2:
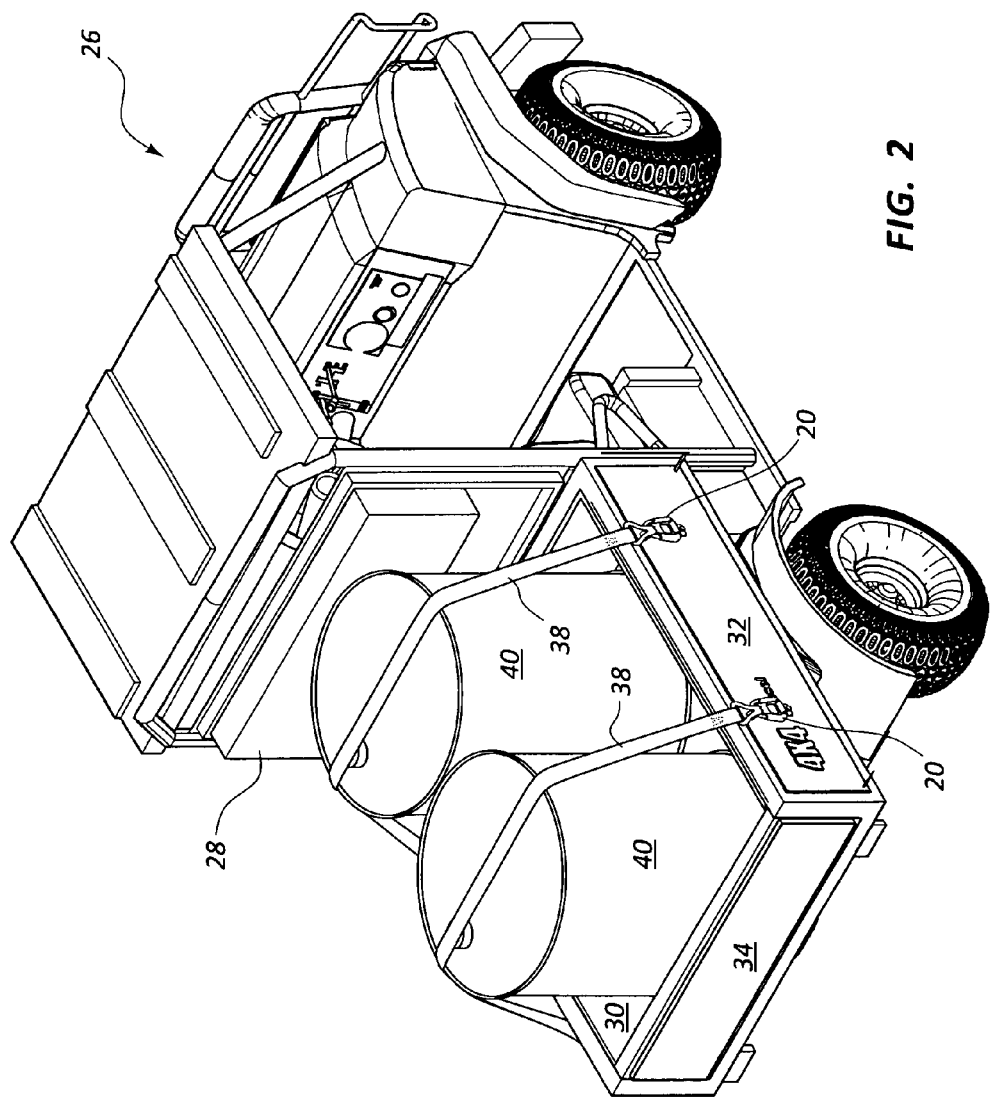
Figure 3:
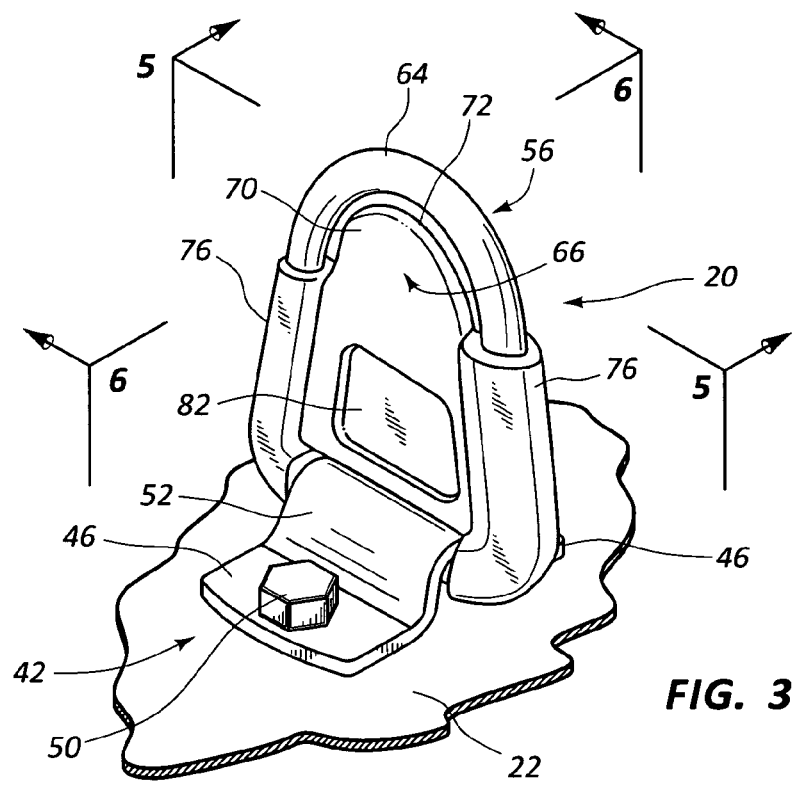
Figure 4:
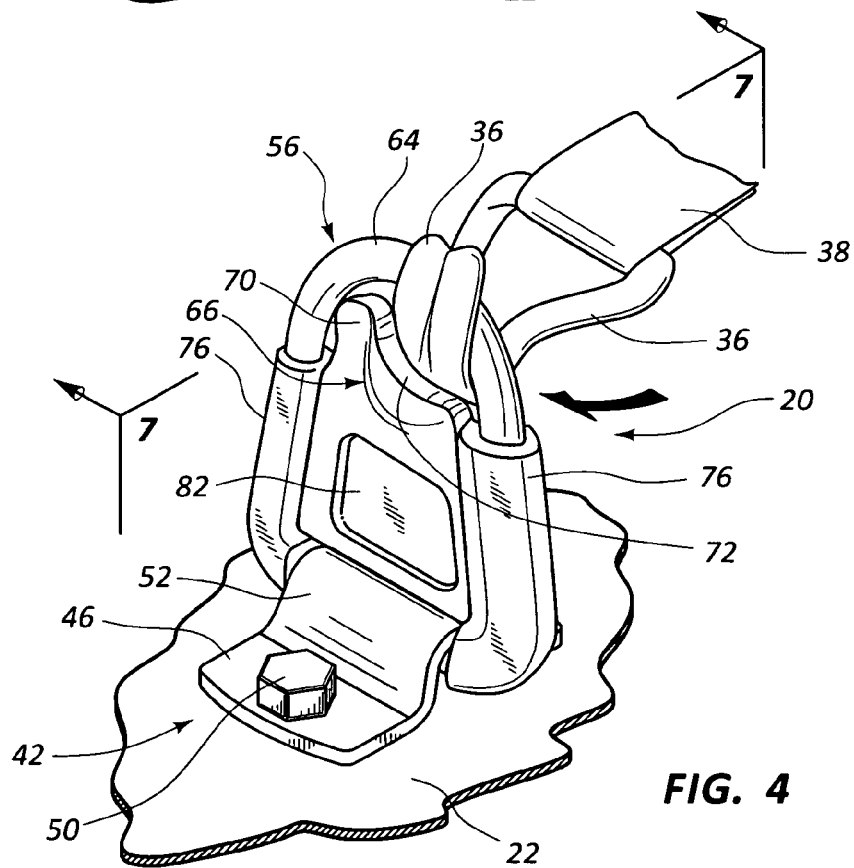
Figure 5:
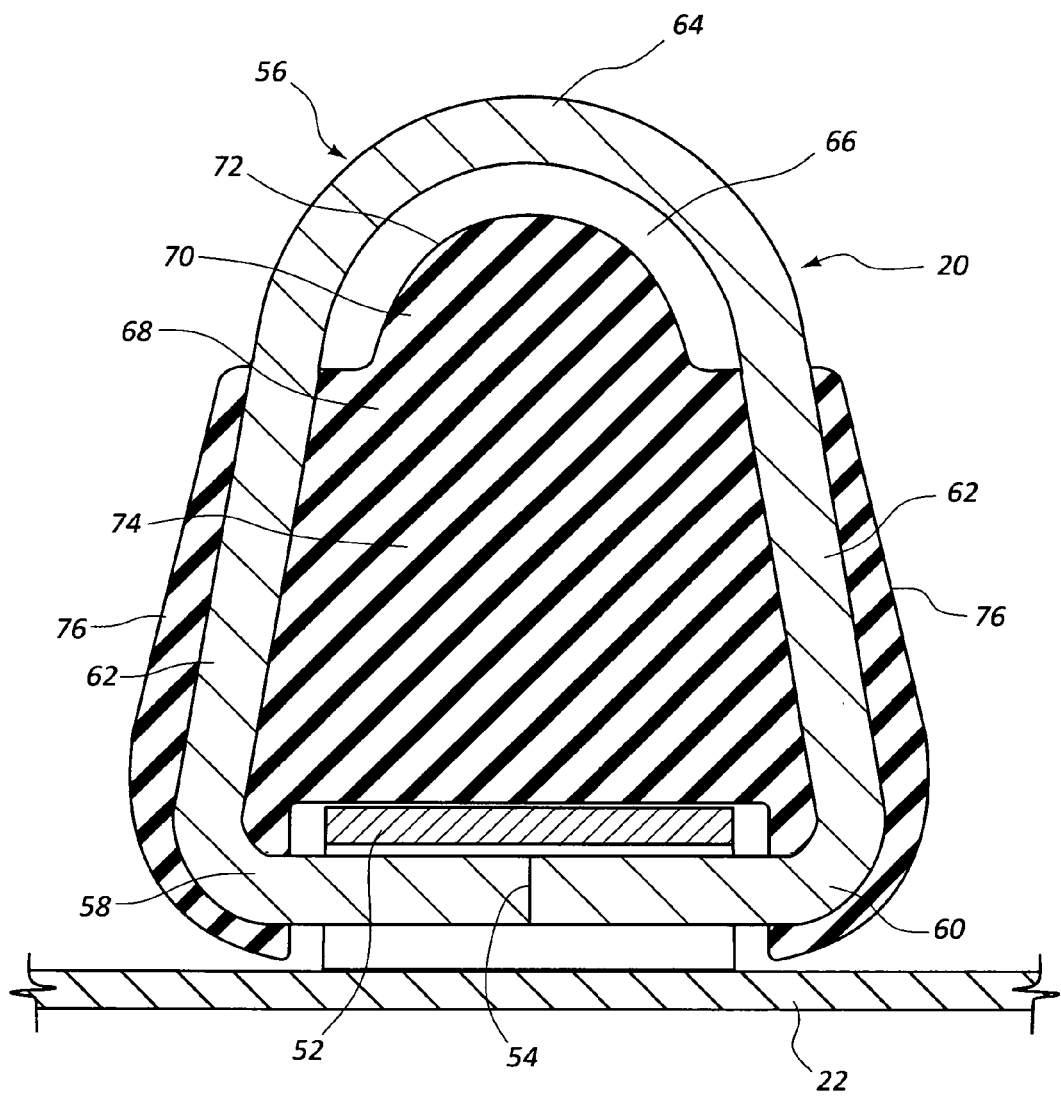
Figure 6:
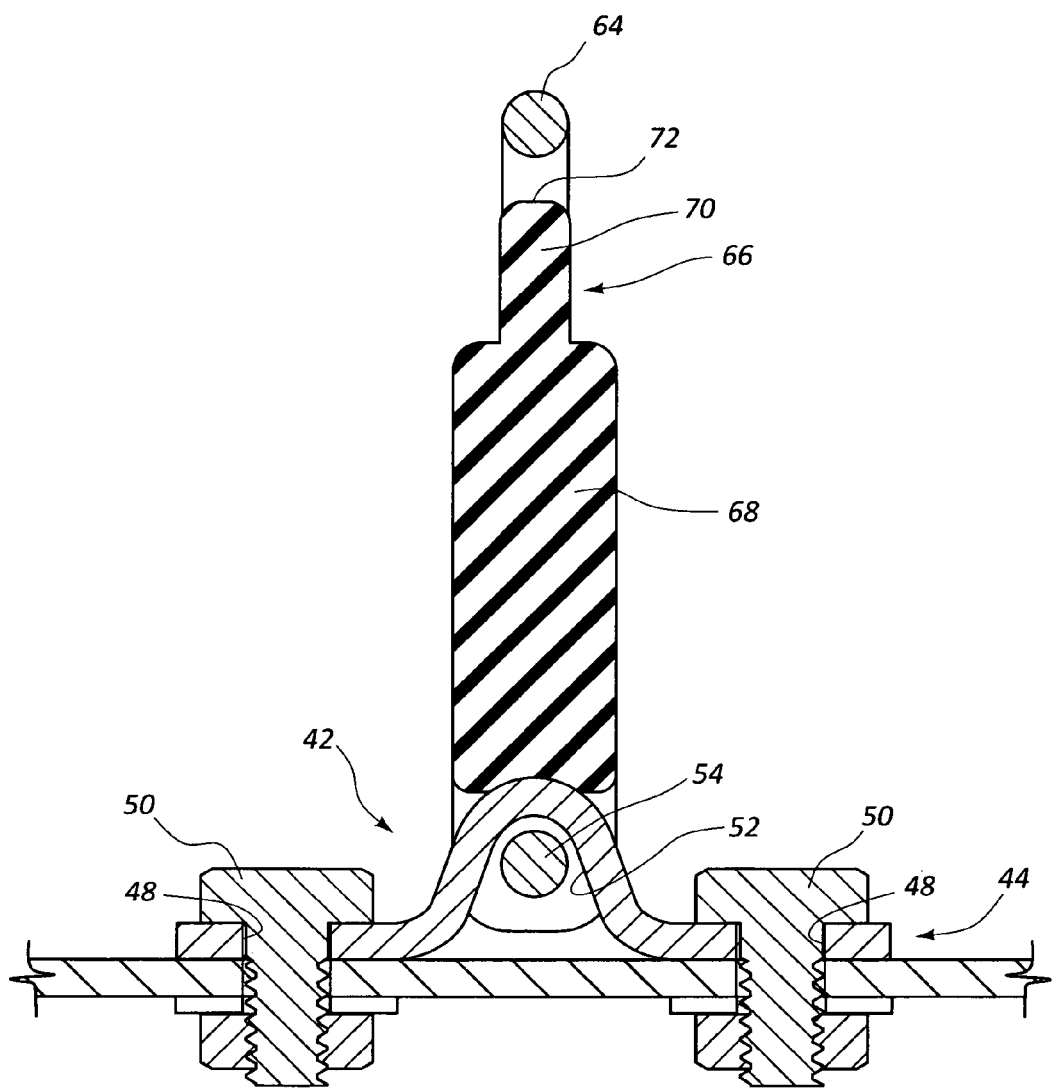
Figure 7:
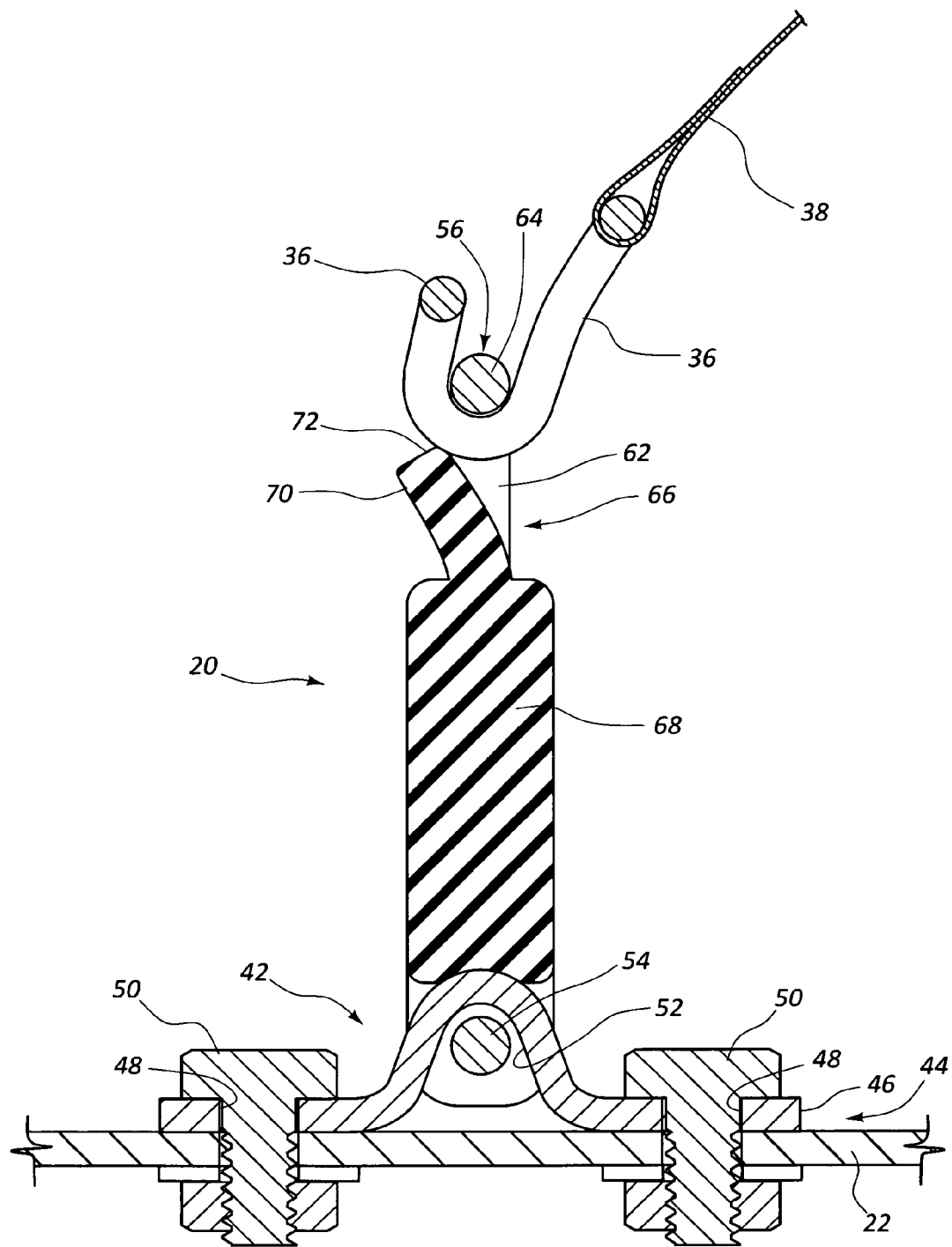
Figure 8:
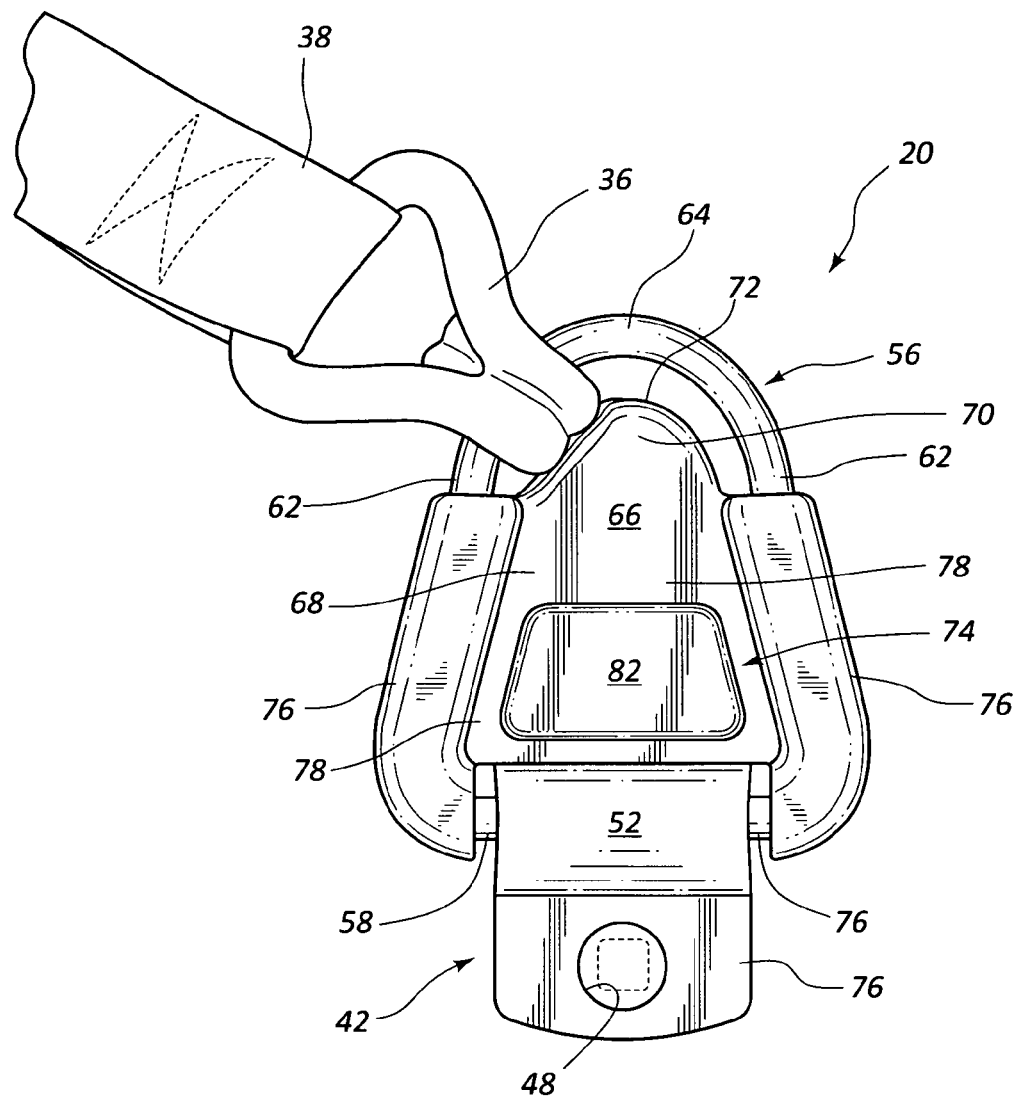
Figure 9:
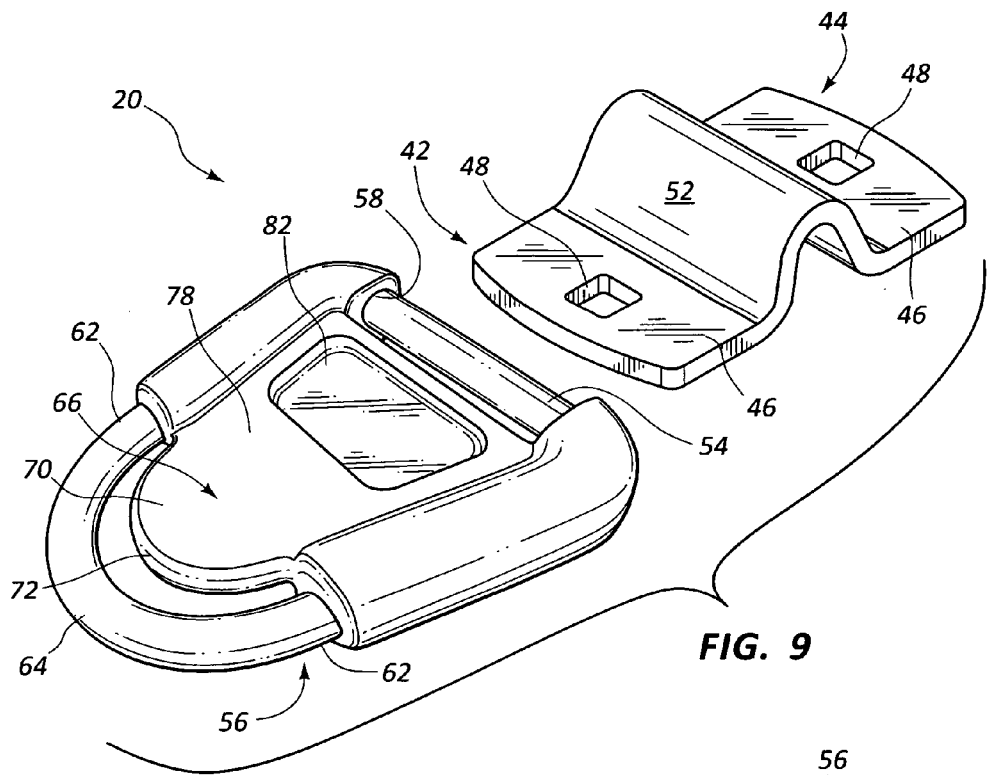
Figure 10:
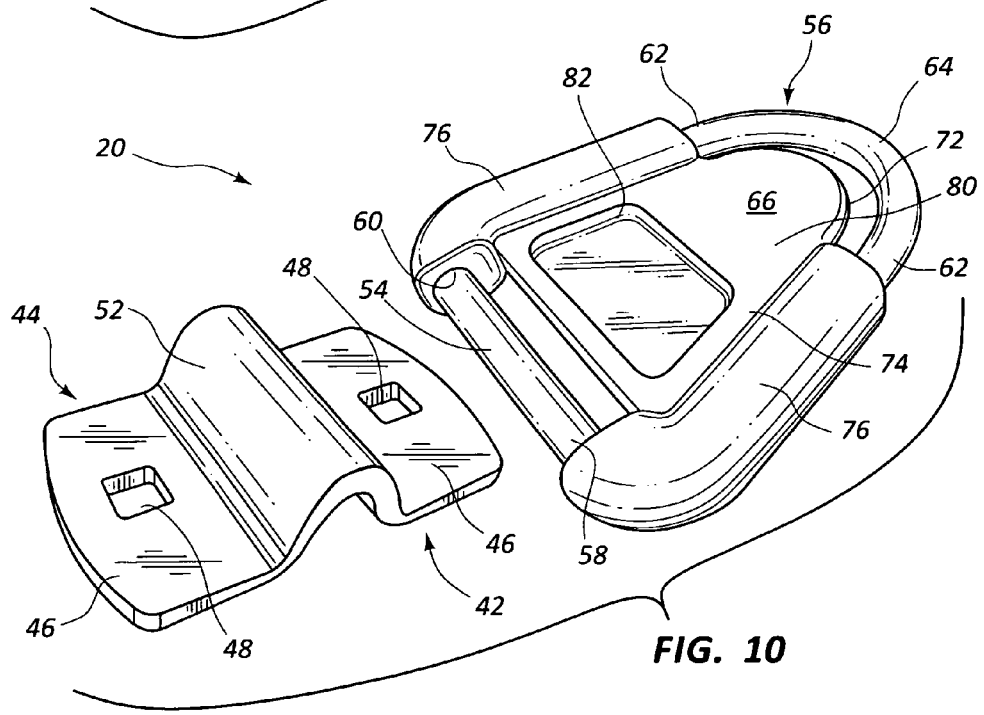
Figure 11:
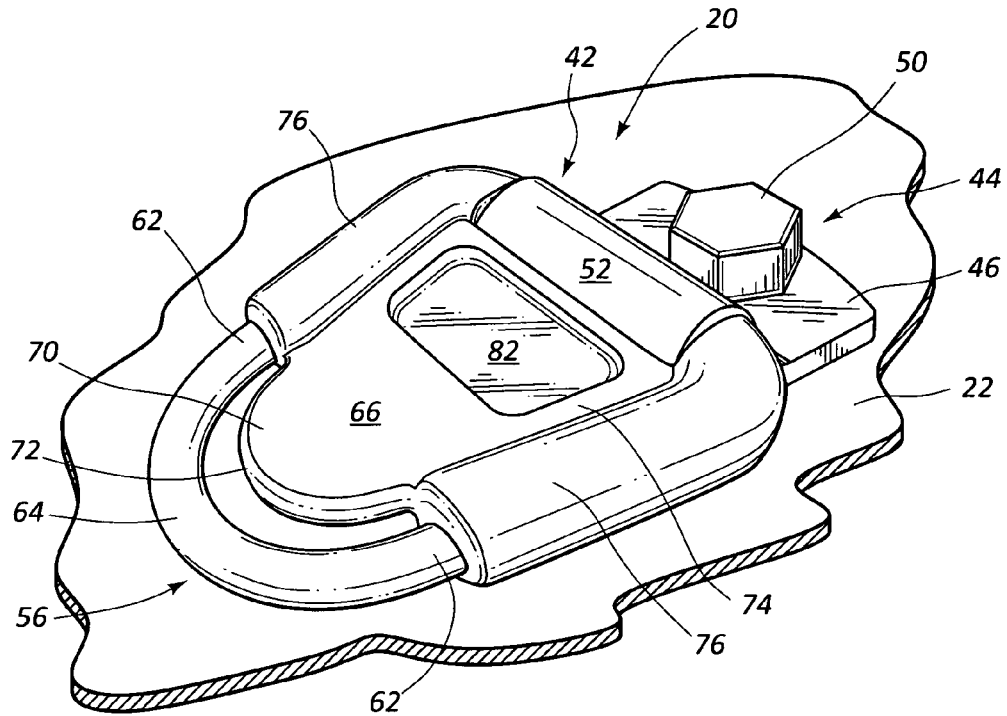
Figure 12:
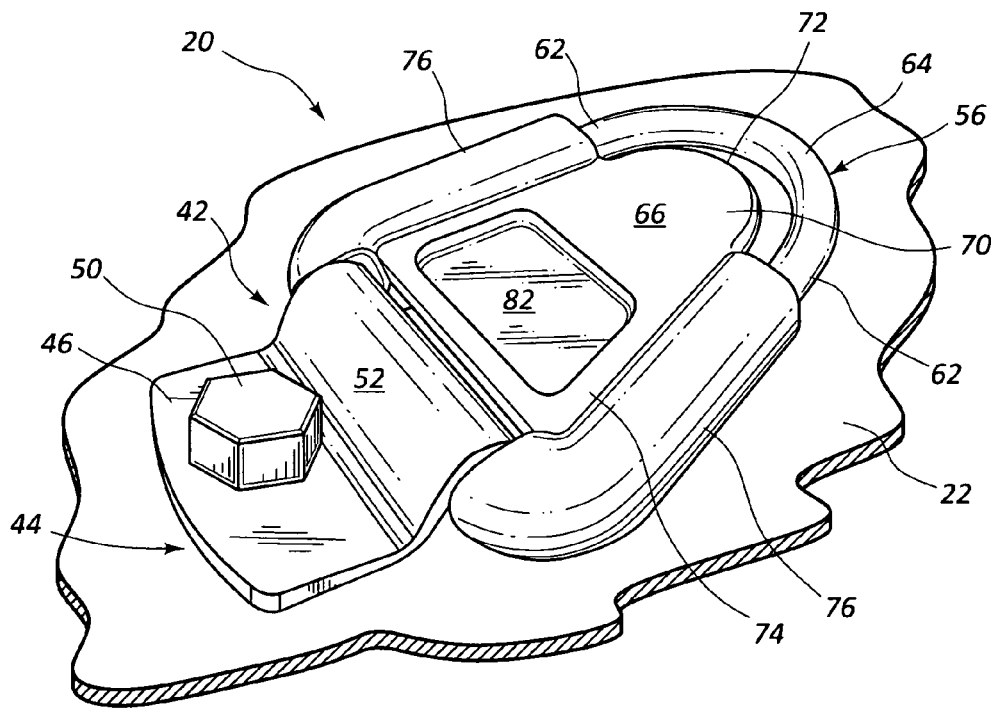
Figure 15:
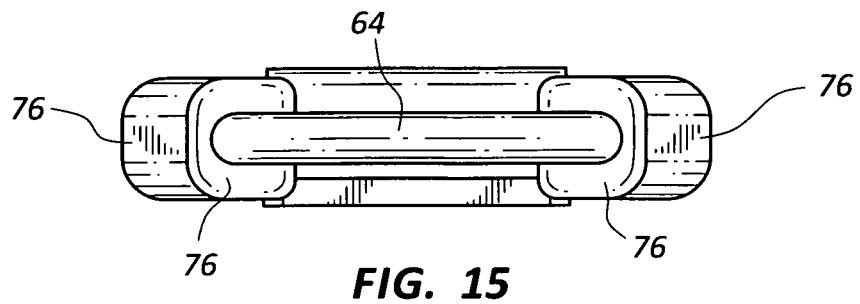
Figure 13:
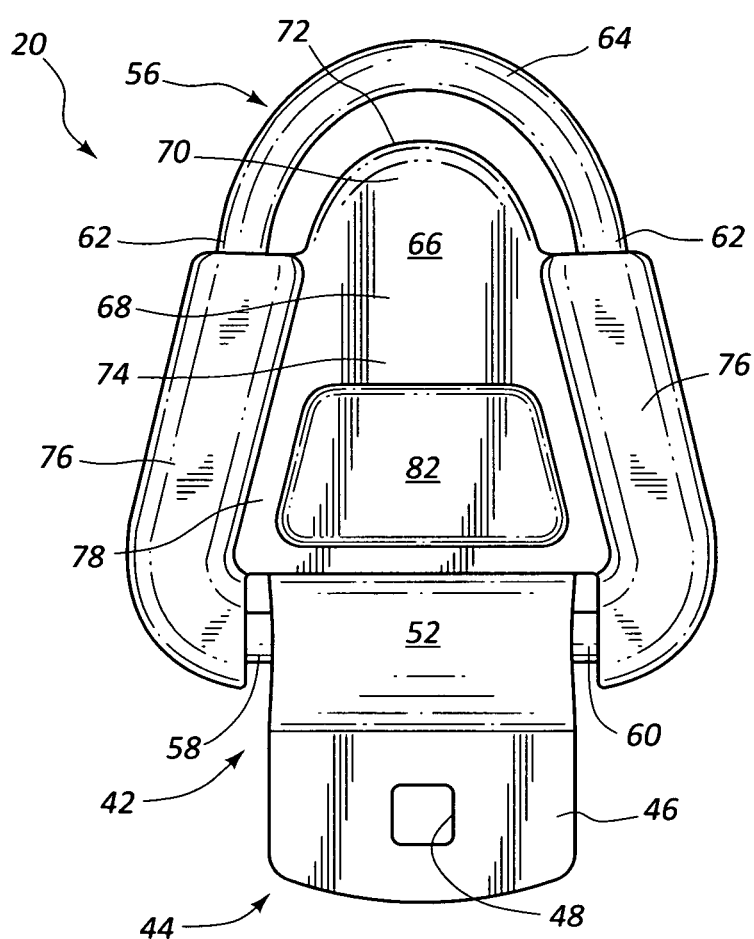
Figure 14:
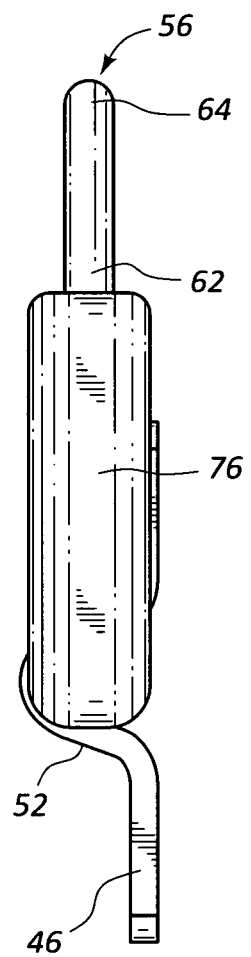
Figure 16:
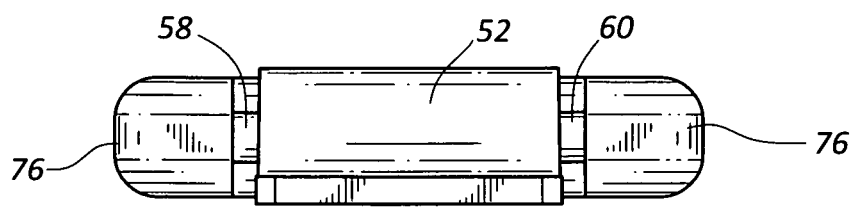

In the drawings;

FIG. 1, is a front, top, perspective view of a flat bed trailer having spaced hook end grippers spaced along opposite sides of the trailer bed;

FIG. 2, a rear top, perspective view of a UTV having spaced hook end grippers fixed to upstanding side walls of a cargo bed and with hooks of load securing straps connected to the hook end grippers;

FIG. 3, a front perspective view of a hook end gripper mounted on a surface, shown fragmentarily;

FIG. 4, a view like that of FIG. 3, further showing a strap (fragmentarily) having a hook with an end hook, the hook being attached to the hook end gripper;

FIG. 5, a vertical section view taken on the line 5-5 of FIG. 3;

FIG. 6, a vertical section view taken on the line 6-6 of FIG. 3;

FIG. 7, a vertical section view taken on the line 7-7 of FIG. 4;

FIG. 8, a rear elevation view of the hook end gripper with a hook at the end of a strap (shown fragmentarily) attached to the hook end gripper;

FIG. 9, a perspective view of the hook end gripper, taken from a top end of the D-ring and showing the rear face of the tongue;

FIG. 10, a view like that of FIG. 9, taken from the bottom end of the D-ring and showing the back face of the tongue;

FIG. 11, a perspective view, taken from above and at the top end of the D-ring, of an assembled hook end gripper, shown mounted to a support surface;

FIG. 12, a view like FIG. 11, taken from the bottom end of the D-ring;

FIG. 13, a front elevation view of the hook end gripper;

FIG. 14, a side elevation view, the opposite side being a mirror image thereof;

FIG. 15, a top plan view;

FIG. 16, a bottom plan view; and

Figure 17:
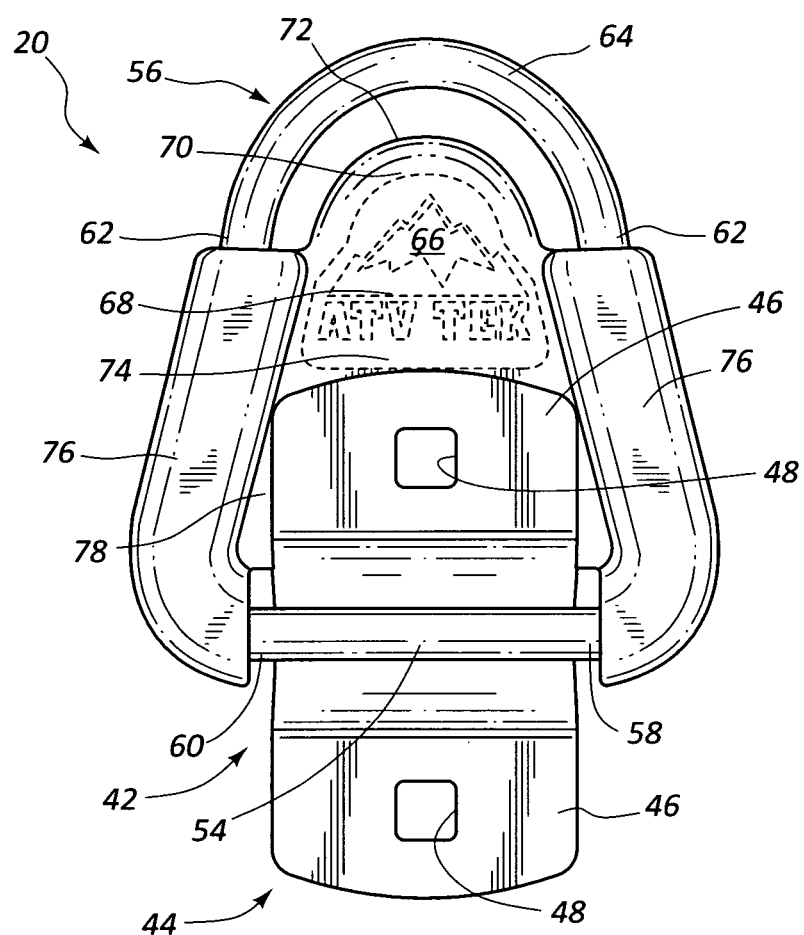

FIG. 17, a rear elevation view.

| Listing of Numbers of drawing Components | |
|---|---|
| Numbers | Components |
| 20 | hook end gripper |
| 22 | flat bed of cargo trailer |
| 24 | cargo trailer |
| 26 | all terrain vehicle |
| 28 | front wall of bed of vehicle 26 |
| 30 | side wall |
| 32 | side wall |

-continued

Listing of Numbers of drawing Components

| Numbers | Components |
|---|---|
| 34 | tail gate |
| 36 | hooks |
| 38 | straps |
| 40 | container barrels |
| 42 | pivot mounting base |
| 44 | mounting plate |
| 46 | pair of flanges |
| 48 | holes |
| 50 | bolts |
| 52 | curved tunnel |
| 54 | straight section |
| 56 | D-ring |
| 58 | end of straight section 54 |
| 60 | end of straight section 54 |
| 62 | side arm sections of D-ring 56 |
| 64 | arch section of D-ring 56 |
| 66 | tongue |
| 68 | fixed end portion of tongue 66 |
| 70 | deformable end portion of tongue 66. |
| 72 | edge of deformable end portion of tongue 66. |
| 74 | central section of hook end gripper 20. |
| 76 | sleeves. |
| 78 | front surface of central section 74. |
| 80 | rear surface of central section 74. |
| 82 | indented portion of front and rear surfaces 78 and 80 of central section 74. |

DETAILED DESCRIPTION

Referring now to the Drawings:

In the illustrated preferred embodiment, the hook end gripper, shown generally at 20, is intended for use with a load securing flexible straps.

FIGS. 1 and 2 show typical uses of the hook end gripper 20. As shown in FIG. 1, pairs of hook end grippers 20 are secured to opposite sides of a flat trailer bed 22 of a cargo trailer, shown generally at 24. The diverse cargo carried, but not shown, on the trailer bed 22 may comprise one, or more all terrain vehicles, pallets supporting goods, or any other goods that must be secured to the trailer bed 22 during transport.

FIG. 2 shows an all-terrain vehicle 26 with a bed having a short front wall 28, spaced apart short side walls 30 and 32 and a tail gate 34. Hook end grippers 20 are shown secured to an exterior surface of the side wall 30. Hooks 36 are on the opposite ends of straps 38. The straps are stretched over the tops of container barrels 40 to secure the barrels against shifting position, tipping and/or falling from the vehicle bed during transport on the vehicle 26.

Each hook end gripper 20 includes a pivot mounting base 42, having a mounting plate 44 for securing the hook end gripper to a load carrying surface. The mounting plate 44 includes a pair of flanges 46, each having a hole 48 there through, though which a bolt 50 is inserted to attach the hook end gripper 20 to the surface. Flanges 46 are interconnected by a curved tunnel 52. When assembled and mounted for use, a straight section 54 of a D-ring 56, having a circular cross-section, is positioned beneath and has ends 56 and 58 projecting from the tunnel 48. The ends 58 and 60 are each curved into a side arm section 62 and the side arm sections 62 are each curved into an arch section 64.

A tongue 66, is made of a material such as durable and resilient, flexible, silicone rubber or silicone plastic, so that the tongue will return to an assigned shape and position after being deformed. Tongue 66 is positioned between the side arm sections 62 and the arch 64. A fixed end portion 68 of the tongue is secured to the side arm sections 62. A deformable, flexible end 70 of the tongue 66 has an edge 72 with a shape and size whereby the edge 72 shape conforms to and is spaced parallel the curve of the arch section 64 of the D-ring 54. The spaced distance between the edge 72 of the tongue 66 and the arch 64 is less than the diameter of a strap hook 36 to be attached to the arch section 64 of D-ring 56.

Tongue 66 is formed integral with and projects from a central section 74 of the hook end gripper 20. Central section 74 also connects to sleeves 76 that enrobe and that are bonded to the side arm sections 62 of D-ring 56. Each front 78 and rear 80 surface of central section 74 has an indented portion 82 that will overlie the heads of bolts 50 when the D-ring is pivoted to overlie the flanges 44 and 46.

In use, hook end gripper 20 is secured to a surface on which objects are to be supported and secured. The objects are placed on the surface and a hook 36 at one end of a flexible strap 38 is connected to the arch section 64 of the D-ring 56, with the hook 36 being connected under the arch section 64, as shown in FIG. 7, or over the arch section 64. Whether the hook 36 is connected under the arch section 64, or over the arch section 64, the act of connecting the hook 36, by a user, will deflect and deform the flexible and resilient tongue 66 while maintaining contact pressure of the resilient tongue 66 with the hook 36. Consequently the hook 36 is held connected to the hook end gripper 20 even if tension is not maintained on the flexible strap 38. The deflected and deformed tongue 66 remains in contact with the hook 36 regardless of the location beneath the arch section 64 to which the hook 36 has been attached or may slide.

Although a preferred embodiment of the invention has been herein described, it is to be understood that such disclosure is by way of example and that variations are possible without departing from the subject matter coming within the scope of the following claims, which claims define our invention.

We claim:

1. A hook end gripper of load securing straps, comprising:
a pivot mounting base having a tunnel and means to secure said tunnel to a load carrying surface;
a D-ring having a section extending through said tunnel and having opposite ends projecting from said tunnel, each said end curving into a side section and each said side section connecting to a leg of an arch section;
a tongue formed from a durable, resilient and flexible material positioned to extend into said arch section, said tongue having a peripheral edge extending parallel to and spaced from each of said legs and the curve of said arch section, and said tongue being spaced from said arch section less than the diameter of an end hook of a load securing strap; and
means securing said tongue to extend into said arch section.

2. A hook end gripper comprising:
a mounting base to be attached to a load supporting surface and having one end of a ring connected thereto, said ring having an arch at an opposite end thereof;
a resilient and deformable tongue, having an edge shaped to conform to an inside of said arch and spaced from the inside of said arch by a distance less than the thickness of an end hook of a flexible strap to be attached to said arch; and
means securing said tongue in position to conform to and spaced from the inside of said arch.

3. A hook end gripper as in claim 2, wherein:
the means securing the tongue in position is secured to the ring.

4. A hook end gripper as in claim 3, wherein:
the means securing the tongue in position comprises a central body section of said hook end gripper, connected to the tongue and to opposite sides of the ring.

5. A hook end gripper as in claim 4, wherein:
the central body section is formed from the same material as the tongue and enrobes lengths of the ring.

6. A hook end gripper as in claim 5, wherein:
the ring is pivotally connected to the mounting base.

7. A hook end gripper of load securing straps, comprising:
a pivot mounting base having a tunnel and means to secure said tunnel to a load carrying surface;
a D-ring having a section extending through said tunnel and having opposite ends projecting from said tunnel, each said end curving into a side section and each said side section connecting to a leg of an arch section;
a tongue formed from a durable, resilient and flexible material positioned to extend into said arch section, said tongue having a peripheral edge extending parallel to the legs and curve of said arch section and being spaced from said arch section less than the diameter of an end hook of a load securing strap; and
means securing said tongue to extend into said arch section, said means comprising anchor means securing said tongue to each side section of said D-ring.

8. A hook end gripper as in claim 7 wherein:
said anchor means comprises a central section of the hook end gripper formed integral with said tongue and with sleeves enrobing and bonded to side arm sections of said D-ring.

9. A hook end gripper as in claim 8, wherein:
the tunnel has flat flanges extending from opposite sides thereof at a bottom of said tunnel, and each said flange has a bore hole there through.

10. A hook end gripper as in claim 9, wherein:
opposite faces of said central section of the hook and gripper have indentations formed therein to overlie the holes formed in the flat flanges of said tunnel.

\* \* \* \* \*